Sept. 8, 1959            C. F. BETHEA            2,903,441
SEPARATION PROCESS
Filed April 9, 1956
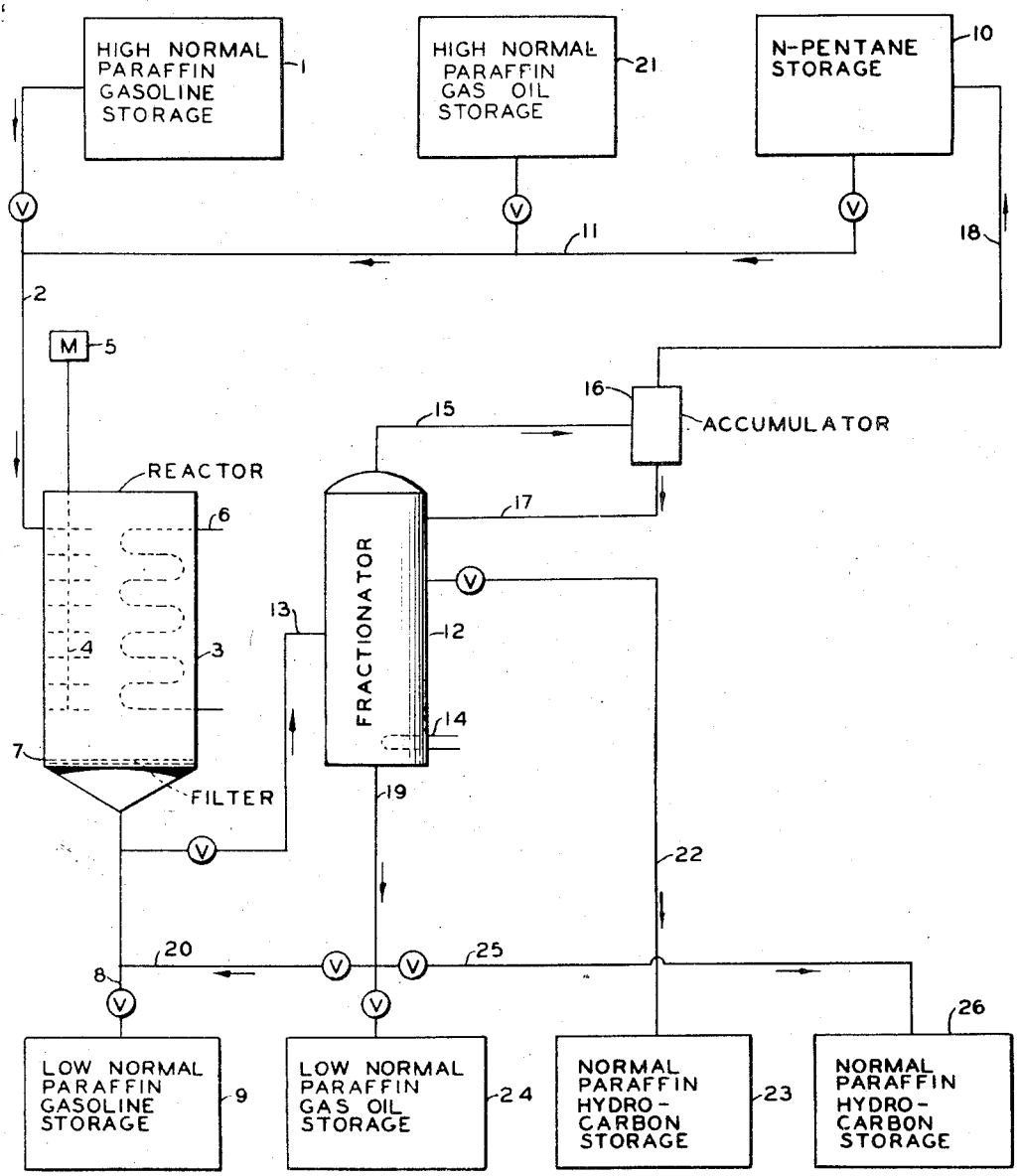
INVENTOR.
C.F. BETHEA
BY Hudson and Young
ATTORNEYS United States Patent Office 2,903,441
Patented Sept. 8, 1959

2,903,441

SEPARATION PROCESS

Charles F. Bethea, Bartlesville, Okla., assignor to Phillips Petroleum Company, a corporation of Delaware Application April 9, 1956, Serial No. 577,151

6 Claims. (Cl. 260—96.5)

This invention relates to a process for the separation of organic compounds. In one of its aspects, it relates to a process for the separation of a class of compounds characterized by straight carbon atom chains from admixture with another class of organic compounds characterized by branched carbon atom chains by the formation of adducts, either of the former with urea or of the latter with thiourea. In another of its aspects, this invention relates to a process for dissociating the urea and thiourea adducts thus formed.

This application is a continuation-in-part of my copending application Serial Number 196,205, filed November 17, 1950, now abandoned.

There are many known processes for the separation of an organic compound from its admixture with other organic compounds. Thus, a compound having a boiling point differing substantially from another compound can be separated therefrom by means of a fractional distillation process. However, compounds having similar boiling points are difficultly separable by such a process. For example, n-octane (B.P. 125.6° C.) cannot be economically separated from 2,2,4-trimethyl-hexane (B.P. 125.5° C.) because of the small difference in boiling points. Such a separation is often desirable as, for example, in a gasoline manufacturing process in order to improve the octane rating of the gasoline by removal of the low octane straight-chain hydrocarbons therefrom. In another type of separation process, advantage is taken of the degree of unsaturation of the compounds being separated. For example, n-octane can be separated from 3-methyl-2-heptene by polymerization of the 3-methyl-2-heptene to form a higher boiling polymer or by its reaction with another compound, such as sulfuric acid, to form an intermediate which is then easily separable from the n-octane.

There has recently been discovered a process for the separation of organic compounds which process permits the separation of a class of compounds having one type of molecular arrangement from a class of compounds having a different molecular arrangement. Thus, straight-chain hydrocarbons can be separated, individually or as a class, from branched-chain and/or cyclic hydrocarbons independently of the boiling points of the compounds being separated. This process depends upon the peculiar property of urea ($CO(NH_2)_2$) which permits it to form adducts with organic compounds having straight carbon atom chains and yet not to form adducts with branched-chain or cyclic organic compounds. Thus, in such a process, it is possible to separate n-octane from 2,2,4-trimethylhexane, isooctane or other branched-chain hydrocarbons, irrespective of their boiling points. Also, straight-chain hydrocarbons can readily be separated from cyclic hydrocarbons, such as benzene, toluene or the cycloparaffins, irrespective of the boiling points of the various components of the mixture thereof. The adducts thus-formed are readily recoverable by filtration or other suitable means from the organic compounds that form no adducts with urea, and then the adducts are dissociated to recover the urea and the adduct-forming organic compounds. This dissociation is ordinarily carried out by treating the adducts with warm water. The water dissolves the urea, and the adduct-forming organic compounds are separated from the aqueous phase as a separate liquid or solid phase. This procedure, if put to commercial use, would involve the continuous recovery of urea from aqueous solution by a process such as evaporation and/or crystallization. To dry the urea it would be necessary to heat it to an elevated temperature or to subject it to a reduced pressure. However, urea is rather unstable at elevated temperatures, and the use of vacuum drying equipment involves considerable expense. It has also been proposed to dissociate the adducts by thermal decomposition. However, such a procedure also entails the loss of urea at the elevated temperatures, and dry, destructive distillation is frequently difficult to adapt to continuous operation.

While urea forms adducts with organic compounds having straight carbon atom chains, thiourea ($CS(NH_2)_2$) forms adducts with organic compounds having branched or cyclic carbon atom chains. Thus, the adduct-forming property of thiourea permits a ready separation of such organic compounds from organic compounds having straight carbon atom chains, since the latter do not form adducts with thiourea. However, the problems of dissociating the thiourea adducts are quite similar to the problems of dissociating the urea adducts, and my invention offers a method for surmounting these problems and difficulties.

It is an object of this invention to provide a novel process for the separation of organic compounds.

It is another object of this invention to provide a novel process for the separation of organic compounds having a straight chain of carbon atoms from branched-chain and/or cyclic organic compounds by formation of adducts of the former with urea.

It is another object of this invention to provide a novel process for the separation of organic compounds having a branched chain of carbon atoms from straight chain organic compounds by formation of adducts of the former with thiourea.

It is a further object of this invention to provide a novel process for dissociating adducts of urea and straight chain organic compounds.

It is another object of this invention to provide a novel process for dissociating adducts of urea and straight chain saturated and/or unsaturated hydrocarbons.

It is a further object of this invention to provide a novel process for dissociating adducts of thiourea and branched chain organic compounds.

Still a further object of this invention is to provide a novel process for dissociating adducts of thiourea and branched chain saturated and/or unsaturated hydrocarbons.

Further and additional objects of this invention will be readily apparent from the disclosure and discussion hereinbelow.

I have found that an adduct of an amide selected from the group consisting of urea and thiourea and an organic compound reactive therewith can be dissociated or decomposed and the organic compound in the adduct with the amide can thus be regenerated by contacting the adduct at a temperature below the decomposition temperature thereof with an organic compound whose adduct with the same amide has a higher decomposition temperature than the decomposition temperature of the original reactant adduct. In a specific aspect I have found that an adduct of urea and a normal paraffin hydrocarbon can be decomposed to regenerate the hydrocarbon by contacting the adduct with a higher molecular weight normal paraffin hydrocarbon at a temperature below the decomposition temperature of the adduct. As a consequence of the reaction, an adduct of urea and the higher molecular weight hydrocarbon is formed, and the lower molecular weight hydrocarbon from the original adduct is then separable from the adduct formed during the reaction. In another aspect I have found that an adduct of thiourea and an isoparaffinic hydrocarbon can be decomposed to regenerate the hydrocarbon by contacting the adduct with a higher molecular weight isoparaffinic hydrocarbon at a temperature below the decomposition temperature of the adduct. During the reaction an adduct of thiourea and the higher molecular weight hydrocarbon is formed. In the same manner naphthenic hydrocarbons and derivatives of normal paraffinic, isoparaffinic and naphthenic hydrocarbons, to be discussed hereinbelow, can be regenerated from their adducts with urea or thiourea, as the case may be, by contacting the adduct with a higher molecular weight homologue of the organic compound in the adduct with the amide at a temperature below the decomposition temperature of the adduct.

My invention, however, is not limited to the use of higher molecular weight homologues of the organic compound in the adduct with the amide to regenerate that organic compound from the adduct. It is possible to use types of organic compounds, other than the type of organic compound in the adduct with the amide, to displace it therefrom, provided that the other type of organic compound is reactive with the same amide to form an adduct therewith and provided that the decomposition temperature of its adduct with the amide is higher than the decomposition temperature of the reactant adduct. By choosing reactants accordingly, a straight-chain saturated alcohol that forms an adduct with urea can be used to displace a normal paraffinic hydrocarbon from its adduct with urea in my process. Similiarly, a straight-chain mercaptan that forms an adduct with urea can be used in place of such an alcohol. Also, a chloride derivative of a branched-chain paraffinic hydrocarbon that forms an adduct with thiourea can be used to displace an isoparaffinic hydrocarbon from its adduct with thiourea. From the description hereinbelow of the organic compounds that form adducts with either urea or thiourea other possible combinations of reactants will be readily apparent. Hereinafter, without limiting my invention, I will employ a higher molecular weight homologue of the organic compound in the adduct with the amide to regenerate that organic compound from the amide, by way of example.

The organic compounds that form adducts with urea are many and varied, and because of such reactivity any straight-chain organic compound capable of forming a solid adduct with urea can be separated from its admixture with any branched-chain or cyclic organic compound that does not form a solid adduct with urea. In determining whether any particular organic compound will or will not form an adduct with urea, it is necessary merely to admix such compound and urea, activated with a solvent as discussed hereinafter, with agitation and then determine whether any crystalline product or adduct has formed. Obviously, such a determination is a matter of mere routine test, and it is well within the skill of the art. However, it has been found that a straight chain organic compound having a straight aliphatic carbon atom chain containing from six to fifty carbon atoms therein will form adducts with urea in preference to branched-chain or cyclic organic compounds. The straight-chain organic compounds can be unsubstituted hydrocarbons as well as hydrocarbons containing substituent groups, which will be discussed hereinbelow, attached to one of the two end carbon atoms of the carbon chain. Thus, one or more of such straight-chain hydrocarbons as the paraffinic hydrocarbons containing from six to fifty carbon atoms, for example, hexane, heptane, octane, nonane, decane, undecane, dodecane, tridecane, tetradecane, pentadecane, hexadecane, heptadecane, nonadecane, eicosane, heneicosane, docosane and progressively higher molecular weight straight-chain paraffins up to and including pentacontane; and the straight-chain olefins containing from six to fifty carbon atoms, for example the hexenes, heptenes, octenes, nonenes, decenes, undecenes, dodecenes, tridecenes, tetradecenes, pentadecenes, hexadecenes, heptadecenes, nonadecenes, eicosenes, heneicosenes, docosenes, and progressively higher molecular weight straight-chain olefins up to and including the pentocontenes, form adducts with urea, and accordingly, they can be readily separated from branched-chain or cyclic hydrocarbons that do not form adducts with urea. Similarly, the corresponding diolefinic hydrocarbons of the above-named compounds form adducts with urea provided the hydrocarbons contain an unbranched chain of from six to fifty carbon atoms. Additionally, many derivatives of these saturated and unsaturated hydrocarbons form adducts with urea. For example, hydroxy, amino, mercaptan, and halide derivatives of these hydrocarbons form adducts with urea. Also, various ketone and ester derivatives of these hydrocarbons react similarly. Ordinarily, the various substituent groups set forth above are attached to one or each of the two end carbon atoms in the unbranched carbon chain of six to fifty carbon atoms. However, when fluoride atoms are attached to the carbon chain, they act similar to hydrogen atoms, and, when attached to any of the carbon atoms in the unbranched chain, they do not inhibit the formation of adducts with urea. The primary characteristic of these organic compounds is the unbranched chain of from six to fifty carbon atoms.

On the other hand, organic compounds containing a branched chain of carbon atoms form adducts with thiourea, and in accordance with this property they are readily separable from organic compounds containing a straight chain of carbon atoms. Thus, with thiourea branched chain hydrocarbons containing from three to fifty carbon atoms in the straight carbon atom chain portion of the molecule and also having one or more alkyl substituents therein ranging from one to twenty carbon atoms in length, for example, methyl propane, the methyl butanes, dimethyl butane, the methyl pentanes, the ethyl pentanes, trimethyl pentane, diethyl pentane, the methyl hexanes, di-, tri-, and tetramethyl hexane, the ethyl hexanes, di-, tri-, and tetraethyl hexane, propyl heptane and other alkyl paraffins as well as methyl propene, the methyl butenes, di-, tri-, and tetramethyl butenes, the methyl pentenes, the ethyl pentenes, trimethyl pentenes, diethyl pentene and other branched-chain olefins including higher molecular weight olefins, for example, methyl, ethyl, propyl and butyl derivatives of hexadecene, docosene and pentacontene, will form adducts with thiourea. Also, the corresponding branched chain diolefinic hydrocarbons react similarly. Furthermore, these branched chain compounds may have attached either to the straight chain or the branched chain of carbon atoms any one of the substituent groups set forth above in the discussion of compounds that form adducts with urea. The primary characteristic of these compounds is the branched chain of carbon atoms.

Various alicyclic-type organic compounds form adducts with thiourea. For example, cycloparaffins, such as cyclopentane, cyclohexane, methylcyclopentane, methylcyclohexane, di- and trimethylcyclopentane, and the like, and the corresponding unsaturated hydrocarbons form adducts with thiourea. Also, menthane has been found to form such adducts with thiourea, as well as oxygenated derivatives of terpenes, such as camphor, borneol, fenchone, and the like. It is within the scope of my invention to separate mixtures of organic compounds containing any of the compounds described above, and it is also within the scope of my invention to decompose adducts of the above-described organic compounds and either urea or thiourea.

The urea adducts that are decomposed in accordance with my invention contain more than three moles of urea per mole of organic compound, and the thiourea adducts contain more than two moles of thiourea per mole of organic compound.

In forming the adducts the organic compounds discussed above are contacted with either urea or thiourea at a temperature below 175° F., and room temperature, say 60 to 80° F., is preferred for the reaction. From B to 100 mols of amide per mol of organic compound are employed, and agitation of the reaction mixture hastens the reaction. The amide can be introduced to the reaction mixture in the solid state or it can be wetted with, say about 10 weight percent, or in a solution, preferably saturated, with the solvents to be discussed hereinbelow. Various methods of contacting the amide and organic compounds can be employed. For example, a solution of the amide in a suitable solvent may be contacted either concurrently or countercurrently with the organic compounds. Also, a slurry or mixture of the amide and solvent may be passed either concurrently or countercurrently with the organic compounds. Additionally, either a fluidized fixed bed or a moving bed of amide may be employed, and the organic compounds are passed into contact therewith.

The adducts can be formed by contacting of the organic compounds described above with either solid urea or solid thiourea. Usually it is desirable to employ a solvent for the amide which may also be termed an activator. Suitable activators are water and methanol, and other low-boiling oxygenated hydrocarbon derivatives may be used. For example, ethanol, acetone, methyl ethyl ketone, propanol, secondary butyl alcohol, and the like are quite suitable as activators. Also, the nitrogen-containing compounds disclosed in the copending application of Ackerman, Serial No. 155,134, filed April 10, 1950, now U.S. Patent No. 2,758,108, may be employed as activators for the adduct-forming reaction. In some instances, sufficient solvent is employed to dissolve the amide, and it is preferred that the resulting solution be saturated with amide at the reaction temperature employed, but unsaturated solutions may be used. Alternatively, solid amide can be used with only sufficient solvent to wet the amide but not sufficient to form a separate, filterable, liquid phase. The temperature at which the adduct-forming reaction is effected is dependent upon the organic compound or compounds employed. In general, the temperature is below the decomposition temperatures of the adducts to be formed and these temperatures are dependent upon the number of carbon atoms in the organic compounds reacting with the amide to form adducts. Usually the temperature is below 175° F., and in most instances room temperature or a temperature of 60 to 80° F. is employed.

The time required for adduct formation will be in the broad range of 0.5 to 100 minutes and will usually be in the range of one minute to sixty minutes. Often times adduct formation will attain substantial equilibrium in 10 to 15 minutes. The time required for the desired extent of adduct formation will depend upon the temperature employed, the ratio of amide to adductable organic compound, upon the activator utilized, and upon other variables which may be introduced into the process. An increase in temperature normally will cause an initial increase in rate of adduct formation, however, a decrease in temperature will result in a higher percent recovery of adductable component from a mixture but at a slower rate. It appears that complete adduct formation of adductable component can be more closely approached at lower temperatures.

When an adduct is formed in a mixture of adductable and non-adductable components and the adduct has been separated from the remaining liquid it is usually desired to wash adhering, non-adductable liquid from the solid adduct so as to recover the adducted component in a pure state upon decomposition of the adduct. It has been found that hydrocarbons having fewer than 6 carbon atoms per molecule are substantially non-adductable with urea and thiourea at ordinary temperatures and therefore, these hydrocarbons are particularly desirable wash materials for adducts because they are easily separated from the adducted component by conventional separation means such as distillation because of the difference in their boiling points. Any means for separating these low boiling hydrocarbons from higher boiling organic materials can be employed for recovering the purified adductable compound recovered by decomposition of the adduct. Specific hydrocarbons which have been found particularly satisfactory for this washing operation include n-pentane, isopentane, n-butane, isobutane, propane, amylenes, butenes, propylenes, pentadiene, butadiene, and the like. Any non-adductable compound which is not a solvent for the amide and is not reactive with the amide can be used as a wash medium is readily separable from the adducted compound which is desired to be obtained as a pure product. Thus, a urea adduct of n-octane can be washed with an inert wash material such as isohexane or with tetramethylhexane because either of these hydrocarbons can be easily separated from n-octane because of the difference in boiling points.

In accordance with my invention an adduct of either urea or thiourea and one of the organic compounds, described above, reactive therewith is contacted with a higher molecular weight homologue of said organic compound at a temperature below the decomposition temperature of the adduct. The organic compound is regenerated from the adduct, and the higher molecular homologue forms an adduct of the amide. The adduct decomposition temperature, to which I refer throughout this disclosure, is that temperature above which the adduct does not exist under any conditions. The decomposition temperatures of the adducts vary with the organic compounds in the adduct with the amide, and in general the thermal stability of an adduct is dependent upon the number of carbon atoms in the organic compound in the adduct with the amide. The adducts containing the organic compounds of a greater number of carbon atoms per molecule are generally more stable thermally than those adducts wherein the organic compounds contain fewer carbon atoms per molecule. For example, an adduct of urea and n-heptane does not exist above about 100° F.; an adduct of urea and n-decane does not exist above about 150° F.; and an adduct of urea and n-hexadecane does not exist above about 205° F. My process is effected at a temperature below the decomposition temperature of the adduct employed, and the actual temperature is ordinarily within the range of 50 to 270° F. Lower temperatures can be used, if desired, but in most instances such temperatures are impractical and uneconomical to use, and higher temperatures tend to cause undesired decomposition of the amide. The data in the specific examples hereinbelow demonstrate that room temperature, or a temperature within the range of 60 to 80° F., can be used.

Various methods of contacting the adduct and the higher molecular weight homologue can be used to carry out my process. For example, the reactants can be introduced to a batch reactor and therein contacted, preferably with agitation. Subsequently, the organic compound regenerated from its adduct with the amide is recovered from the resulting reaction mixture. Also, the higher molecular weight homologue can be passed either concurrently or countercurrently with a moving bed of the adduct. Additionally, the higher molecular weight homologue can be passed through a stationary bed of the adduct, and, as another method of contacting, the velocity of the higher molecular weight homologue may be such that the adduct is in the form of a fluidized bed. In any event, the reaction is such that the organic compound in the adduct with the amide is displaced by the higher molecular weight homologue.

The proportions of adduct and higher molecular weight homologue employed in my process are variable. Equal parts by weight can be used, and in some instances it is desirable to use a greater proportion of the homologue in order to obtain efficient mixing of the reactants. However, if desired, the homologue can be used in a proportion less than that equivalent by weight to the adduct. In this latter instance, it may be desirable to use a diluent in order to improve the mixing of the reactants. For example, when reacting an adduct of urea and nonane with hexadecane, a hydrocarbon or other organic compound nonreactive with urea can be used with the reactants. Also, nonane itself or lower molecular weight homologues of nonane can be used as a diluent. Preferably, in carrying out my process from 0.5 to 20 parts by weight of higher molecular weight homologue are employed per part of adduct, and the reactants are contacted for a period of time within the range of 1 minute to 10 hours, preferably from 5 to 60 minutes.

I will describe my invention in further detail in a specific process for removing normal paraffinic hydrocarbons from a gasoline fraction and from a higher-boiling gas oil fraction. The process will be described with reference to the accompanying drawing which represents a specific method of effecting my invention. Conventional equipment, such as pumps, compressors, flow control equipment, and the like, have not been included in this drawing, but the inclusion of such equipment is within the scope of my invention.

Referring now to the accompanying drawing, a high normal paraffinic gasoline is withdrawn from storage 1 via line 2 and passed to reactor 3. This reactor has previously been charged with urea and sufficient water, say 5 to 10 weight percent based on the urea, to wet the urea. Reactor 3 is also provided with stirrer or mixer 4 operated by motor 5 and with heating or cooling coils 6 to provide any required heating or cooling. In reactor 3 the gasoline fraction is contacted with the urea with agitation at a temperature below 175° F. and preferably within the range of 60 to 80° F. for a period of 1 to 60 minutes. During the reaction normal paraffinic hydrocarbons in the gasoline react with the urea to form solid adducts while the other hydrocarbons remain unreacted. Reactor 3 is also provided with filter 7, and at the completion of the adduct-forming reaction the unreacted hydrocarbons are withdrawn from the reactor through the filter by suction, if required. The withdrawn hydrocarbons or gasoline of low normal paraffinic content is then passed via line 8 to storage 9. Adducts of urea and normal paraffin hydrocarbons are thus retained in reactor 3. Subsequently, n-pentane is withdrawn from storage 10 and passed via lines 11 and 2 to reactor 3 where it is agitated with the adduct and thus washes unreacted hydrocarbons therefrom. Unreacted hydrocarbons and n-pentane are then withdrawn through filter 7 and passed either directly to storage 9 or to fractionator 12 via line 13. Fractionator 12, provided with heater 14, is operated to take n-pentane overhead via line 15 to accumulator 16. The n-pentane required for reflux is returned to the fractionator via line 17 and unrecycled n-pentane is returned to storage 10 via line 18. Gasoline of low normal paraffin content is withdrawn from fractionator 12 as bottoms product via line 19 and passed via lines 20 and 8 to storage 9.

After the adduct in reactor 3 has been washed with n-pentane, a high normal paraffin gas oil fraction is removed from storage 21 and passed to reactor 3 via lines 11 and 2. In reactor 3 the gas oil fraction and adduct are agitated at a temperature within the range of 60 to 80° F., and normal paraffin hydrocarbons in the gas oil fraction, higher boiling than the hydrocarbons in the adduct, react with the adduct to displace hydrocarbons therefrom. The reaction mixture in reactor 3 then contains gas oil of low normal paraffin hydrocarbon content, low molecular weight normal paraffins displaced from the adduct, adduct of urea and normal paraffin hydrocarbons from the gas oil feed, and any remaining unreacted adduct of urea and low molecular weight paraffins. The gas oil fraction and low molecular weight paraffins are withdrawn from reactor 3 through filter 7 and passed via line 13 to fractionator 12 while the adducts are retained in reactor 3. Fractionator 12 is operated to take overhead n-pentane that remained on the adduct as a result of the previously described washing step. Low molecular weight hydrocarbons displaced from the adducts by contact with the gas oil fraction are withdrawn from fractionator 12 via line 22 and thus passed to storage 23, and gas oil of low normal paraffin content is withdrawn from fractionator 12 as bottoms product via line 19 and thus passed to storage 24.

After the filtering step in reactor 3 has been completed, n-pentane from storage 10 is passed to reactor 3 where it is employed to wash occluded liquid from the adducts, and n-pentane and occluded liquid washed from the adducts are then removed from reactor 3 through filter 7 to fractionator 12 where it is fractionally distilled to take n-pentane overhead and to recover paraffins regenerated from the adducts and low paraffin gas oil via lines 22 and 19, respectively. After washing the adducts in reactor 3 additional n-pentane is introduced thereto, and the temperature in the reactor is raised to a temperature sufficient to decompose the adducts and within the range of 200 to 270° F. While hot the n-pentane and hydrocarbons resulting from the decomposition of the adducts are removed from reactor 3 via filter 7 and passed via line 13 to fractionator 12. If desired, additional n-pentane may then be introduced to reactor 3 to wash occluded hydrocarbons, obtained from decomposition of the adducts, from the urea in the reactor, and the n-pentane and hydrocarbons washed from the urea are passed to fractionator 12. This washing is effected at a temperature within the above-named range in order to prevent reformation of adducts at a lower temperature. Paraffinic hydrocarbons from the decomposed adducts and n-pentane are then fractionally distilled in fractionator 12, and the n-pentane is taken overhead to storage 10. Paraffinic hydrocarbons removed from the gas oil feed are withdrawn as bottoms product and passed via lines 19 and 25 to storage 26, and paraffinic hydrocarbons removed from the gasoline feed are withdrawn via line 22 and passed to storage 23. Reactor 3 is again charged with high normal paraffin gasoline from storage 1, and the process thus-described is repeated.

It is within the scope of my process to use a plurality of reactors similar to reactor 3 in order that the various reactors can be on different cycles of the above-described process. It is also possible to use more than one fractionator to effect the necessary fractional distillation steps already discussed. The plurality of reactors and fractionators can then be employed in such a manner that continuous streams of products are obtained from the system. Such a process is commercially and economically desirable.

The following examples are illustrative of my invention.

*Example I*

A urea-nonane adduct was prepared by stirring together at room temperature for 2 hours 245 cc. of n-nonane, 248 grams of urea, 50 cc. of methanol and 250 cc. of isopentane as a diluent to facilitate stirring. The resulting adduct was filtered from the reaction mixture, washed with additional isopentane and dried.

To one part by weight of the urea-nonane adduct thus-prepared was added two parts by weight of n-hexadecane. The mixture was maintained at room temperature for 8 hours, and it was found that 51.3 percent of the nonane in the original adduct had been displaced from the adduct by n-hexadecane.

Example II

To one part by weight of the urea-nonane adduct, prepared as described above, was added one part by weight of n-hexadecane and three parts by weight of nonane at room temperature. At the end of 6 hours 35.2 percent of the nonane had been displaced from the adduct by n-hexadecane.

In both of the above examples relatively long contact timese were employed to insure that equilibrium was reached, and it is within the scope of my invention to use shorter contact times, as already discussed.

Numerous advantages and modifications of my process will be obvious from the above disclosure to those skilled in the art.

That which is claimed is:

1. A method for separating straight chain organic compounds adductable with urea from branched chain organic compounds adductable with thiourea from two organic compound fractions containing the same, the second fraction being higher boiling and containing higher molecular weight organic compounds than the first fraction which comprises passing said first fraction to a reaction zone containing an amide selected from the group consisting of urea and thiourea; recovering non-adductable organic compounds from said reaction zone as a product of the process; recovering an adduct of said adductable organic compound of said first fraction; contacting said adduct with the higher boiling organic compound fraction at a temperature below the decomposition temperature of said adduct thereby displacing the low boiling organic compound from said adduct by an adductable organic compound contained in said higher boiling fraction; recovering an adduct of said adductable organic compound of said second fraction; recovering a mixture of low boiling adductable organic compounds and high boiling non-adductable compounds comprising a mixture easily separable because of different boiling points; separating said mixture into a high boiling fraction and a low boiling fraction as separate products of the process; and decomposing the remaining adduct and recovering therefrom high boiling adductable organic material as a further product of the progess.

2. A method for removing normal paraffinic hydrocarbons from a gasoline fraction and from a gas oil fraction which comprises passing said gasoline fraction into a reaction zone containing urea wetted with from 5 to 10 weight percent of water; intimately contacting said gasoline with said urea in said reaction zone for a period of from 1 to 60 minutes at a temperature in the range of 60 to 80° F. so as to form adducts of said urea and normal paraffinic hydrocarbons; removing and recovering normal paraffinic hydrocarbon depleted gasoline from said reaction zone as a product of the process; washing said adducts with normal pentane so as to remove unreacted gasoline hydrocarbons therefrom; removing and distilling said pentane wash so as to recover additional gasoline fraction; passing said gas oil fraction into said reaction zone; intimately contacting said gas oil fraction and said adduct in said reaction zone for a period of 5 to 60 minutes at a temperature in the range of 60 to 80° F. so as to displace gasoline fraction normal paraffinic hydrocarbons of said adduct with gas oil normal paraffinic hydrocarbons; removing liquid hydrocarbons from thus formed adducts and distilling said hydrocarbons so as to recover normal paraffinic hydrocarbon depleted gas oil as a product of the process and gasoline normal paraffinic hydrocarbons as a product of the process; washing the adducts with normal pentane so as to remove unreacted liquid hydrocarbons therefrom; separating and removing wash liquid to a distillation zone; distilling said wash liquid so as to recover normal pentane as an overhead product, gasoline fraction normal paraffinic hydrocarbons as a side cut product and normal paraffinic hydrocarbon depleted gas oil as a bottom product; intimately contacting the adduct in said reaction zone with normal pentane at a temperature in the range 200 to 270° F. so as to decompose the adduct to urea and normal paraffinic hydrocarbon; removing a resulting mixture of normal pentane and regenerated normal paraffinic hydrocarbons to said distillation zone; and distilling said mixture so as to recover normal pentane as an overhead product and gas oil fraction normal paraffinic hydrocarbons as a bottom product.

3. A method for removing normal paraffinic hydrocarbons containing from six to fifty carbon atoms per molecule from two hydrocarbon fractions containing same, the second fraction being higher boiling and containing higher molecular weight normal paraffinic hydrocarbons than the first fraction, which comprises passing said first fraction to a reaction zone containing urea wetted with from 5 to 10 weight percent of water; intimately contacting said first fraction with said urea in said reaction zone for a period of 1 to 60 minutes at a temperature in the range of 60 to 80° F. so as to form adducts of said urea and normal paraffinic hydrocarbons; removing and recovering normal paraffinic hydrocarbon depleted first fraction from said reaction zone as a product of the process; washing said adducts with pentane so as to remove unreacted first fraction hydrocarbon therefrom; removing and distilling said pentane wash so as to recover additional first fraction hydrocarbon; passing said second fraction into said reaction zone; intimately contacting said second fraction and said adduct in said reaction zone for a period of 5 to 60 minutes at a temperature in the range of 60 to 80° F. so as to displace first fraction normal paraffinic hydrocarbon from said adduct with second fraction paraffinic hydrocarbon; removing liquid hydrocarbon from thus formed adducts and distilling said hydrocarbon so as to recover normal paraffinic hydrocarbon depleted second fraction as a product of the process and first fraction normal paraffinic hydrocarbons as a product of the process; washing the adducts with pentane so as to remove unreacted liquid hydrocarbon therefrom; separating and removing wash liquid to a distillation zone; distilling said wash liquid so as to recover pentane as an overhead product, first fraction normal paraffinic hydrocarbon as a sidecut product and normal paraffinic hydrocarbon depleted second fraction as a bottom product; intimately contacting the adduct in said reaction zone with pentane at a temperature in the range of 200 to 270° F. so as to decompose the adducts of urea and paraffinic hydrocarbon; removing a resulting mixture of pentane and regenerated normal paraffinic hydrocarbon to said distillation zone; and distilling said mixture so as to recover pentane as an overhead product and second fraction normal paraffinic hydrocarbons as a bottom product.

4. A method for separating straight chain hydrocarbons and branched chain hydrocarbons containing from 6 to 50 carbon atoms per molecule from 2 hydrocarbon fractions containing the same, the second fraction being higher boiling and containing higher molecular weight hydrocarbons than the first fraction, which comprises passing said first fraction to a reaction zone containing an amide selected from the group consisting of urea and thiourea; intimately contacting said first fraction with said amide in said reaction zone at a temperature below the decomposition temperature of an adduct of said amide and a component of said first fraction adductable with said amide for a period of time sufficient to form such adducts; removing and recovering the non-adductable hydrocarbon remaining as a product of the process; washing said adducts with a material inert to said amide and being easily separable from the adducted hydrocarbon so as to remove non-adductable hydrocarbon of said first hydrocarbon fraction adhering to said adducts; removing said wash liquid and separating therefrom first hydrocarbon non-adductable with said amide; passing said second hydrocarbon fraction into said reaction zone; intimately contacting said second fraction with said adduct at a temperature below the decomposition temperature of said adduct of said amide and said adductable component of said first fraction for a period of time sufficient to displace first fraction hydrocarbon from said adduct with second fraction adductable hydrocarbon; removing liquid hydrocarbon from said reaction zone and separating said hydrocarbon so as to recover adductable hydrocarbon-depleted second fraction as a product of the process and first fraction adductable hydrocarbons as another product of the process; washing the adducts in said reaction zone with a material inert to said amide and being easily separable from adductable first fraction hydrocarbon and non-adductable second fraction hydrocarbon; removing said wash liquid to a separation zone so as to recover wash liquid, first fraction adductable hydrocarbon and second fraction non-adductable hydrocarbon-depleted hydrocarbon as separate products, intimately contacting the adduct in said reaction zone with a material inert to said amide and easily separable from said second fraction adductable hydrocarbon at a temperature above the decomposition temperature of the adduct of said second fraction adductable hydrocarbon for a period of time sufficient to decompose said adduct; removing a resulting mixture of wash liquid and regenerated adductable hydrocarbon to a separation zone; and separating said mixture so as to recover wash material and second fraction adductable hydrocarbon as separate products.

5. The method of claim 4 wherein the amide is urea and the adducts are formed from normal paraffins.

6. The method of claim 4 wherein the amide is thiourea and the adducts are formed from iso-paraffins.

References Cited in the file of this patent

UNITED STATES PATENTS

| | | |
|---|---|---|
| 2,577,202 | Lien et al. | Dec. 4, 1951 |
| 2,676,167 | Findlay et al. | Apr. 20, 1954 |
| 2,681,303 | Anderson et al. | June 15, 1954 |

UNITED STATES PATENT OFFICE
CERTIFICATE OF CORRECTION

Patent No. 2,903,441                               September 8, 1959

Charles F. Bethea

It is hereby certified that error appears in the printed specification of the above numbered patent requiring correction and that the said Letters Patent should read as corrected below.

Column 9, line 42, for "product of the progess" read -- product of the process --.

Signed and sealed this 17th day of May 1960.

(SEAL)
Attest:

KARL H. AXLINE
Attesting Officer

ROBERT C. WATSON
Commissioner of Patents